(12) United States Patent
Poplack et al.

(10) Patent No.: US 12,182,485 B1
(45) Date of Patent: Dec. 31, 2024

(54) EMBEDDED PROCESSOR ARCHITECTURE WITH SHARED MEMORY WITH DESIGN UNDER TEST

(71) Applicant: CADENCE DESIGN SYSTEMS, INC., San Jose, CA (US)

(72) Inventors: Mitchell G. Poplack, San Jose, CA (US); Christopher Coffman, San Jose, CA (US); Hitesh Gannu, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 978 days.

(21) Appl. No.: 16/209,885

(22) Filed: Dec. 4, 2018

(51) Int. Cl.
| | |
|---|---|
| *G06F 30/33* | (2020.01) |
| *G06F 9/455* | (2018.01) |
| *G06F 30/331* | (2020.01) |
| *G06F 30/3323* | (2020.01) |
| *G06F 30/398* | (2020.01) |
| *G06F 115/02* | (2020.01) |
| *G06F 117/08* | (2020.01) |

(52) U.S. Cl.
CPC ............ *G06F 30/33* (2020.01); *G06F 30/331* (2020.01); *G06F 30/398* (2020.01); *G06F 9/455* (2013.01); *G06F 30/3323* (2020.01); *G06F 2115/02* (2020.01); *G06F 2117/08* (2020.01)

(58) Field of Classification Search
CPC .................................................... G06F 30/331
See application file for complete search history.

(56) References Cited

U.S. PATENT DOCUMENTS

| | | | | | |
|---|---|---|---|---|---|
| 5,808,921 | A  * |  9/1998 | Gold | ....................... | G06F 9/455 |
| | | | | | 702/108 |
| 5,838,948 | A  * | 11/1998 | Bunza | ..................... | G06F 30/33 |
| | | | | | 703/27 |
| 6,141,791 | A  * | 10/2000 | Takuma | .............. | G06F 11/3624 |
| | | | | | 717/125 |
| 6,223,144 | B1 * |  4/2001 | Barnett | ............... | G06F 11/3664 |
| | | | | | 703/14 |
| 6,289,488 | B1 * |  9/2001 | Dave | ....................... | G06F 30/30 |
| | | | | | 716/105 |
| 6,298,452 | B1 * | 10/2001 | Hill | .................. | G01R 31/31835 |
| | | | | | 714/33 |
| 6,553,328 | B1 * |  4/2003 | Gold | ..................... | G06F 11/261 |
| | | | | | 702/108 |
| 6,859,913 | B2 * |  2/2005 | Fennell | ................... | G06F 30/33 |
| | | | | | 716/106 |
| 7,072,818 | B1 * |  7/2006 | Beardslee | ........ | G01R 31/31705 |
| | | | | | 703/14 |
| 7,146,581 | B2 * | 12/2006 | Klein | ..................... | G06F 30/30 |
| | | | | | 716/103 |
| 7,386,827 | B1 * |  6/2008 | Zhu | ........................ | G06F 30/33 |
| | | | | | 716/103 |

(Continued)

*Primary Examiner* — Akash Saxena
(74) *Attorney, Agent, or Firm* — Foley & Lardner LLP

(57) ABSTRACT

A shared memory is provided between simulation processors and emulation processors within an emulation chip. The shared memory is configured to enable the simulation processors and the emulation processors to exchange simulation data and emulation data respectively with each other during simulation and emulation operations. The simulation processors and the emulation processors may update their respective simulation and emulation operations in response to the simulation data and the emulation data exchanged via the shared memory.

18 Claims, 4 Drawing Sheets

(56) References Cited

U.S. PATENT DOCUMENTS

| | | | |
|---|---|---|---|
| 7,424,416 B1* | 9/2008 | Cavanagh | G06F 30/331 703/23 |
| 7,437,280 B1* | 10/2008 | Ballagh | G06F 30/331 703/13 |
| 7,478,027 B2* | 1/2009 | Ban | G06F 30/33 703/13 |
| 7,664,626 B1* | 2/2010 | Ferrie | G06F 9/455 703/23 |
| 7,747,423 B1* | 6/2010 | Shirazi | G06F 30/331 703/13 |
| 7,937,259 B1* | 5/2011 | Chan | G06F 30/331 703/28 |
| 8,082,139 B1* | 12/2011 | Ballagh | G06F 30/331 703/23 |
| 8,453,086 B2* | 5/2013 | Tung | G06F 30/33 716/109 |
| 8,532,975 B2* | 9/2013 | Poplack | G06F 30/33 703/23 |
| 8,812,289 B1* | 8/2014 | Chan | G06F 30/331 703/28 |
| 9,015,026 B2* | 4/2015 | Poplack | G06F 30/33 703/23 |
| 9,069,918 B2* | 6/2015 | Poplack | G06F 30/33 |
| 9,195,784 B2* | 11/2015 | Tseng | G06F 30/331 |
| 10,324,740 B1* | 6/2019 | Poplack | G06F 30/00 |
| 11,176,018 B1* | 11/2021 | Aluri | H03M 7/70 |
| 2002/0162094 A1* | 10/2002 | Barret | G06F 11/261 717/134 |
| 2004/0078179 A1* | 4/2004 | Fuji | G06F 30/331 703/15 |
| 2004/0103349 A1* | 5/2004 | Nardini | G06F 11/3636 714/39 |
| 2006/0031807 A1* | 2/2006 | Abramovici | G01R 31/318533 716/106 |
| 2008/0288910 A1* | 11/2008 | Chaudhry | G06F 30/33 716/116 |
| 2008/0312900 A1* | 12/2008 | Akiba | G06F 11/3652 703/23 |
| 2009/0271167 A1* | 10/2009 | Zhu | G06F 30/331 703/14 |
| 2010/0305933 A1* | 12/2010 | Chang | G06F 30/331 703/15 |
| 2014/0156253 A1* | 6/2014 | McIlvain | G06F 11/27 703/28 |
| 2015/0242541 A1* | 8/2015 | Cerny | G06F 30/3323 716/106 |

* cited by examiner

100

200

EMBEDDED PROCESSOR ARCHITECTURE WITH SHARED MEMORY WITH DESIGN UNDER TEST

TECHNICAL FIELD

This application is generally directed towards processor-based emulation systems, and specifically relates to methods and systems for efficient data sharing between emulation operations and simulation operations of the processor-based emulation system.

BACKGROUND

Modern semiconductor based integrated circuits are incredibly complex and contain millions of circuit devices, such as transistors, and millions of interconnections between the circuit devices. The complexity of the integrated circuits combined with the use of devices using the integrated circuits in industrial products of high importance has made integrated circuit design verification an essential process in a semiconductor development cycle. The design verification is also essential because fabricating the integrated circuit is expensive and takes time, and if the integrated circuit contains functional errors, the integrated circuit will have to be corrected and then re-fabricated. Accordingly, many different platforms for functional verification of integrated circuits have been developed.

For example, circuit designers use computer-based electronic design automation tools for synthesis, debugging, and functional verification of their circuit designs (referred to herein as the "design under test"). The design under test is usually provided in the form of a netlist description of the design. The netlist may have been derived from many sources, including from a hardware description language. A netlist description is a description of the circuit's components and electrical interconnections between the components of the circuit design. The components include the circuit elements necessary for implementing a logic circuit design, such as combinational logic (e.g., gates) and sequential logic (e.g., flip-flops and latches).

One type of circuit design verification system is a hardware-based design verification system (e.g., an emulation system) that implement a user's circuit design in a plurality of programmable circuits. Another type of design verification system is a software-based verification system (e.g., a simulation system). Simulation, being a software-based approach, involves a design under test (or a portion thereof) and a test bench compiled into machine-executable model and executed at a host workstation. The test bench includes a series of test vectors (e.g., stimulus) that are used to simulate the circuit design and may include modules that receive the outputs from the design under test after the vectors are run in the design under test.

In some cases, the circuit designers may employ an emulation system in conjunction with a software-based simulation system to verify the functional behavior of a circuit design, sometimes referred to as simulation acceleration verification process. The simulation process may include a conventional event-based logic simulator or any software process on a host workstation than can act as a portion of the verification environment. In the simulation acceleration verification process, the emulation system is in communication with the host workstation employing the simulation system to transmit data between the simulation and emulation systems. The data can include digital test vectors or other signals from a logic system ("target system") in which the design under test is intended for installation after fabrication. The simulation process may also be used to model components of the system which may not be modeled in the emulation system.

The emulation system and the host workstation may transfer data to each other via a peripheral component interconnect bus. Using the peripheral component interconnect bus, the host workstation can deposit data into the emulation system by writing the data to data arrays of the emulation system. The data that is written to the data arrays become accessible by one or more processors of the emulation system. The reading and writing of the data using the peripheral component interconnect bus occurs at relatively slow speed, thereby slowing the entire emulation process. Various other approaches have also been employed in order to transfer the data between the simulation operations running in the host workstation and the emulation operations running on the emulation system. In one conventional approach, a software-based simulation system accesses the states of a hardware-based emulation system by querying the emulator through a network path to a local processor in the emulation system and then uses an address/data handshake path. A problem with the aforesaid approach is that the network path to the embedded processor in the emulation system has very high latency due to the reaction time of the local processor that receives the request, accesses the appropriate elements in the emulation system, then formulates a response, and sends it across the network to the workstation. In another conventional approach, an interface connects to a series of register circuits programmed into the emulated logic of the design under test. The simulation accesses are grouped into a burst of data into and/or out of the registers. The burst of data is transferred across a data path between the emulated registers and a memory buffer on the peripheral component interconnect card in the host workstation. A problem with aforesaid approach is that only a portion of host workstation memory could be used as emulation data due to hardware limitations, which results in an undesirable situation where long bits in the simulator could not be mapped directly to bits in the memory buffer.

Accordingly, there are significant problems in the conventional approaches associated with data sharing between the simulation operations often running in the host workstation and the emulation operations.

SUMMARY

What is therefore desired are systems and methods for uninterrupted, comprehensive, and fast data transfers between simulation operations and emulation operations. What is further desired are systems and methods enabling a processor core running simulation to interact directly with a processor core running emulation via a common memory enabling exchange of data between the simulation and emulation operations.

Embodiments disclosed herein attempt to solve the aforementioned technical problems and may provide other benefits as well. A shared memory is provided between simulation processors and emulation processors within an emulation chip. The emulation chip may include embedded processor cores performing simulation operations (simulation processors) alongside processor cores performing emulation operations (emulation operations). The shared memory is configured to enable the simulation processors and the emulation processors to exchange simulation data and emulation data respectively with each other during simulation operations executed by the simulation processors and emulation operations executed by emulation processors. The simulation processors and the emulation processors may update their simulation and emulation operations in response to the analysis of the simulation data and the emulation data exchanged via the shared memory. Furthermore, the simulation processors may operate in conjunction with one or more processes on the host workstation, performing a portion of the simulation-related tasks, or facilitating a more efficient the interaction between the emulation processers and the host workstation. The simulation processors may also enable additional verification methodologies by extracting data from the emulation processors and analyzing the extracted data.

In an embodiment, an emulation system may include an emulation processor configured to emulate a portion of a design under test. The emulation system may further include a simulation processor configured to execute one or more simulation operations received from the emulation processor emulating the portion of the design under test and write a simulation data record generated by executing the one or more simulation operations to a non-transitory storage medium. The emulation processor is further configured to read the simulation data record from the non-transitory storage medium and update at least one emulation operation of the design under test based on the simulation data record.

In another embodiment, an emulation method may include emulating, by a emulation processor, emulating a portion of a design under test; executing, by a simulation processor, one or more simulation operations received from an emulation processor emulating the portion of a design under test; writing, by the simulation processor, a simulation data record generated by executing the one or more simulation operations to a non-transitory storage medium; reading, by the emulation processor, the simulation data record from the non-transitory storage medium; and updating, by the emulation processor, at least one emulation operation of the design under test based on the simulation data record.

BRIEF DESCRIPTION OF THE DRAWINGS

The accompanying drawings constitute a part of this specification and illustrate an embodiment of the subject matter described herein.

DETAILED DESCRIPTION

The illustrative systems and methods disclosed herein described herein simulation processor cores (simulation processors) embedded alongside emulation processor cores (emulation processors) within an emulation chip in an emulation system. The emulation processor cores may provide a hardware-based design verification and the simulation processor cores may provide a software-based design verification. For the hardware-based design verification, the emulation processor cores may execute instructions to emulate logic states of the hardware elements of the design under test. For the software-based verification, the simulation processor cores may generate and operate on data records simulating the behavior of the design under test. The simulation processors and emulation processors may share a memory to write the corresponding simulation data and emulation data. Because of the embedded simulation processors and the shared memory, the emulation processors may not have to send emulation data all the way back to the host workstation through slow cables and wait for a response. As the relevant simulation operations may occur locally with the simulation data dump in a shared memory, the emulation operations may be significantly faster than the conventional systems.

Figure 1A:
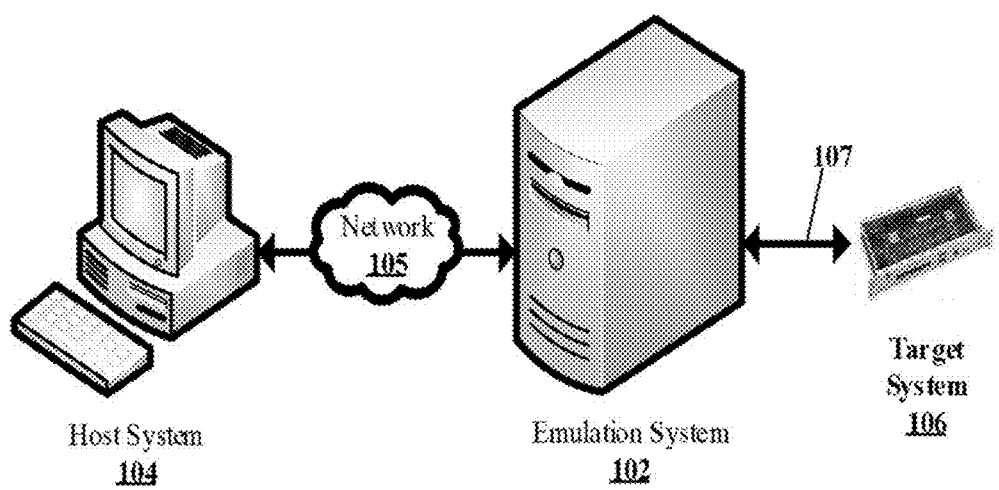
FIG. 1A shows an environment of an emulation system, according to an embodiment.

FIG. 1A shows an environment 100 of an emulation system 102. The environment 100 may include the emulation system 102, a host system 104, a target system 106, a network 105, and a connection 107. The emulation system 102 and the host system 104 are connected to each other via the network 105. The network 105 may be any kind of communication link facilitating communication between the host system 104 and the emulation system 102. For example, the network 105 may be a local area network, a metropolitan area network, a wide area network, and/or the Internet. The emulation system 102 and the target system 106 communicate with one another via the connection 107. The connection 107 may be a communication link such as electrical, optical, or wireless communication link configured to facilitate a communication with the emulation system 102 and the target system 106.

The emulation system 102 may include a combination of hardware and software modules, which may emulate and/or simulate a design under test. The emulation system 102 may include a set of emulation processors within emulation chips to execute one or more emulation operations, clusters of emulation chips, non-transitory memory devices, buffers, data storage devices configured to provide a system platform for emulating the design under test. The clusters may be arranged in multiple boards. The boards may be arranged within multiple racks. Multiple racks may be arranged in a plurality of emulation apparati, which may be analogous to multi-rack servers.

The emulation system 102 may also be loaded with a simulation tool. A set of simulation processors of the emulation system 102 may execute the simulation tool to perform one or more simulation operations. The simulation tool is configured to compile and execute a test bench. The test bench is configured to execute one or more verification processes on the design under test for functionally verifying a circuit design. The circuit design and test bench may be specified using a hardware modeling language, such as hardware description languages (e.g., Verilog) or higher-level languages, such as SystemC, System Verilog, and the like, or programming languages, such as C, C++, and the like. In some cases, the circuit design may include behavioral portions that are not directly synthesizable. The behavioral portions of the circuit design can be modeled in software, for example, compiled and executed via the simulation tool. Likewise, the test bench may include synthesizable portions capable of being modeled in hardware. The synthesizable portions of the test bench may be synthesized and implemented in the emulation system 102.

The host system 104 may include one or more workstations that may run debug and runtime software interacting with the emulation system 102. The workstations may be any type of computing devices such as a desktop computers, laptop computers, tablet computers, and smartphones.

The target system 106 may include hardware and/or software modules configured to interact with the design under test being emulated and/or simulated. The target system 106 may be an external hardware environment provided by a circuit designer, and further include multiple devices such as memory, microprocessors, application specific integrated circuits, field programmable gate arrays, etc. The target system 106 may also include inputs/outputs. The inputs/outputs correspond to the inputs and the outputs of the circuit design being emulated, and are in electrical communication with the connection 107.

The above described systems 102, 104, 106 of the environment 100 are merely illustrative and other configuration should be considered to be within the scope of this disclosure. For example, the network 105 may include the local connection 107 or a combination of multiple local interconnects. In some embodiments, the systems 102, 104, 106 may be local and housed within the same building. In other embodiments, one or more of the systems 102, 104, 106 may be accessed remotely. For example, the host system 104 may remotely access the emulation system 102 through the network 105 using a remote access protocol such as internet protocol (IP).

Figure 1B:
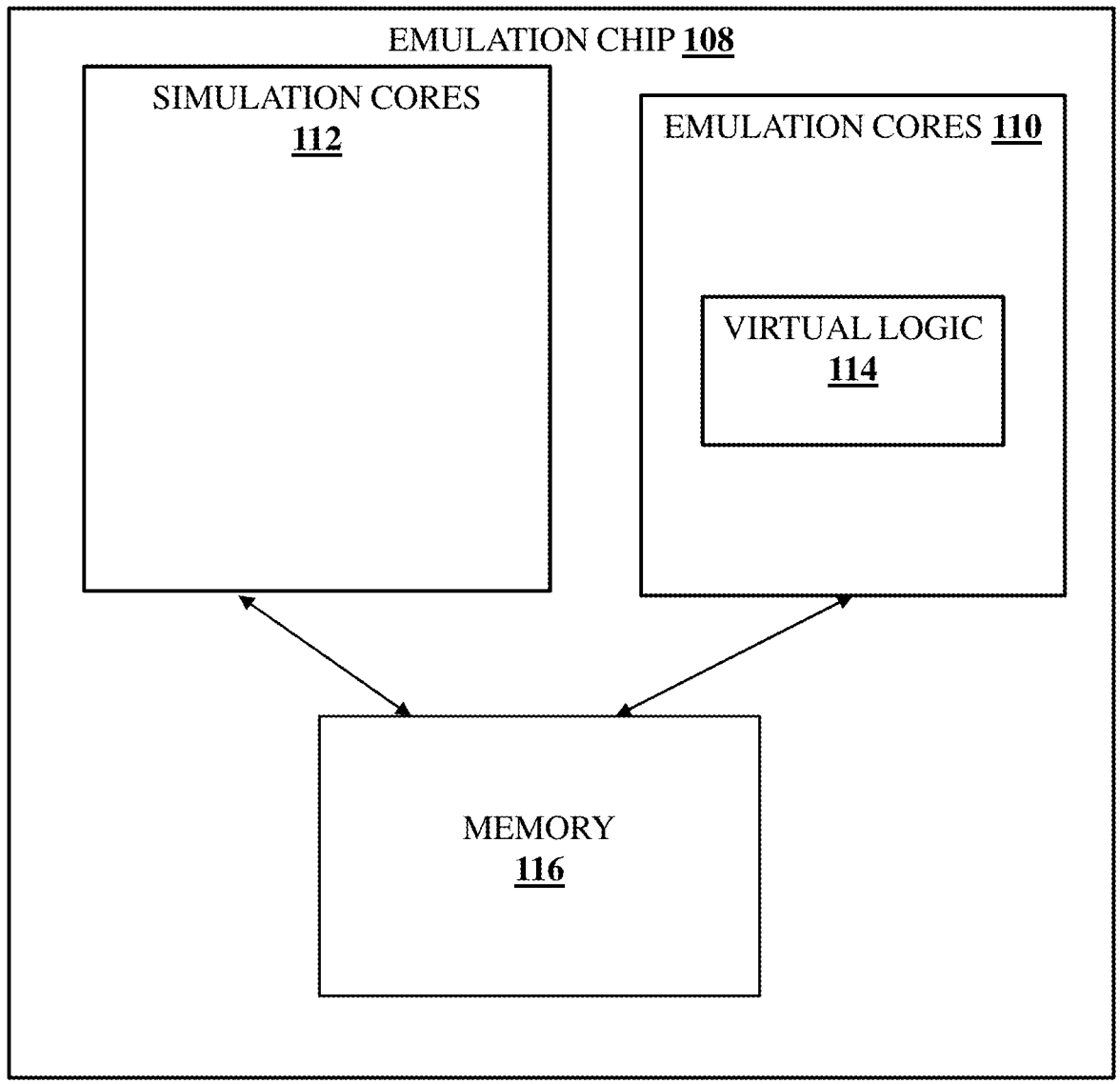
FIG. 1B shows a block diagram depicting components of an emulation chip of an emulation system, according to an embodiment.

FIG. 1B shows a block diagram depicting components of an emulation chip 108 (also referred to as emulation ASIC) of an emulation system 102. The emulation chip 108 may include emulation cores 110 that may be emulation processors to execute one or more emulation operations/processes. The one or more emulation processors are embedded in the emulation chip 108. Each emulation processor may include logic, circuitry, and interfaces that are operable to execute one or more instructions to perform emulation operations/tasks. The emulation cores 110 may be executing a virtual logic 114, which may be a portion of the design being emulated.

The emulation chip 108 may further include simulation cores 112. The simulation cores 112 may be simulation processors to execute one or more simulation operations/processes. The one or more simulation processors are embedded in the emulation chip 108. Each simulation processor may include logic, circuitry, and interfaces that are operable to execute one or more instructions to perform simulation operations/tasks. The examples of the simulation processor may include, but are not limited to, an x86 processor, a reduced instruction set computing processor, an application-specific integrated circuit processor, or a complex instruction set computing processor.

A memory 116 is embedded in the emulation chip 108. Within the emulation chip 108, the memory 116 is coupled to one or more of the emulation cores 110 executing one or more emulation operations and one or more of the simulation cores 108 executing one or more simulation operations.

In operation, a circuit designer first creates the virtual logic 114 using a circuit design software. The circuit design software operates on the host system 104. When the circuit designer has completed the circuit design, the circuit design is compiled into a data format that is compatible with the emulation processors of the emulation cores 110 and the simulation processors of the simulation cores 112. The compiled design is then loaded into the emulation cores 110 and the simulation cores 112 via the host system 104. The simulation cores 112 and the emulation cores 110 simulates and emulates the circuit design, which is then operated with the target system 106 to determine whether the circuit design operates properly in the target system 106. When connected to the target system 106, the inputs and outputs of the circuit design are transmitted through inputs/outputs in the target system 106.

During the emulation/simulation operation, the simulation cores 112 may execute simulation operations associated with the virtual logic 114 and subsequently generate simulation data. The simulation operation is defined as the creation of a simulation model which, if subjected to arbitrary stimuli, responds in a similar way to the manufactured and the circuit design. In addition, the simulation model may substantially be responsible for generating stimuli for the design under test, which primarily resides in emulation. The simulation model is implemented as a computer program. Upon execution of the simulation modes, the simulation data is generated. The simulation cores 112 may then write the simulation data into the memory 116.

The emulation cores 110 may execute emulation operations on the virtual logic 114 to identify the functional errors in the circuit design, and subsequently generate emulation data. The emulation data may include debugging data, that is, information about the internal states of the circuit design during execution of the emulation operations. Once generated, the emulation data is then written into the memory 116.

The simulation cores 112 may directly write the simulation data into the memory 116, which may be directly read by the emulation cores 110. Upon reading the simulation data, the emulation cores 110 may process and analyze the simulation data. In response to processing and analyzing the simulation data, the emulation cores 110 may update subsequent emulation operations being performed. The emulation cores 110 may then execute the updated emulation operations. In response to the execution of the updated emulation operations, the emulation cores 110 may produce new emulation data. The emulation cores 110 may then write the new emulation data in the memory 116.

Correspondingly, the emulation cores 110 directly write the emulation data into the memory 116, which may be directly read by the simulation cores 112 from the memory 116 to identify and fix functional errors in the circuit design. Upon reading the emulation data, the simulation cores 112 may process and analyze the emulation data. In response to processing and analyzing the emulation data, the simulator 112 may update subsequent simulation operations being performed. The simulation cores 112 may then execute the updated simulation operations. In response to the execution of the updated simulation operations, the simulation cores 112 may produce new simulation data. The simulation cores 112 may then write the new simulation data in the memory 116.

Being asynchronous to the emulation model 114 and having access to memory 116, the simulation cores 112 may also be used, in concert with instrumentation logic added into the virtual model 114, to perform additional tasks besides logic verification, such as estimation of power consumption of the design by analyzing signal toggling properties, collection of design verification metrics such as coverage analysis, and design property checking such as assertion checking. The simulation cores 112 may receive logic states of one or more signals in the virtual model 114 and perform one or more operations of the logic states of received signals. For instance, the simulation cores 112 may determine the toggling properties (e.g., frequency of the change of the logic states) of the one or more signals. Based on the toggling properties, the simulation cores 112 may estimate the power consumption of the virtual model 114. The simulation cores 112 may also compare the logic states of the signals to one or more design verification metrics.

Based on the comparison, the simulation cores may perform a coverage analysis of the virtual model 114. A coverage analysis may provide an indication of what portions of the virtual model 114 were covered by the emulation operations of the emulation cores 110. In addition, the simulation cores 112 may perform a design property check based on the logic states of the received signals. A design property check may be, for example, an assertion check. An assertion check may determine whether the emulation cores 110 have reached a signal state while executing the emulation model 114. The result of the assertion check may be a Boolean variable: a "true" indicating that the signal state was reached or a "false" indicating that the signal state was not reached. Furthermore, the simulation cores 112 may transfer data between the emulation cores 110 and a host system.

The memory 116 may be partitioned into multiple sub-components. A first sub-component of the memory 116 may be configured to store the emulation data and a second sub-component of the memory 116 may be configured to store the simulation data. The emulation cores 110 may be configured to write the emulation data in the first sub-component of the memory 116 but is able to read any data from the first sub-component of the memory 116 and the second sub-component of the memory 116. The simulation cores 112 may be configured to write the simulation data in the second sub-component of the memory 116 but is able to read any data from the first sub-component of the memory 116 and the second sub-component of the memory 116. It should be understood that the designation of which locations in the shared memory 116 represent simulation data versus emulation data or vice versa may not always be defined as, in effect, both partitions have access to the same memory and these locations may be accessed by both the simulation cores 112 and emulation cores 110.

Figure 2:
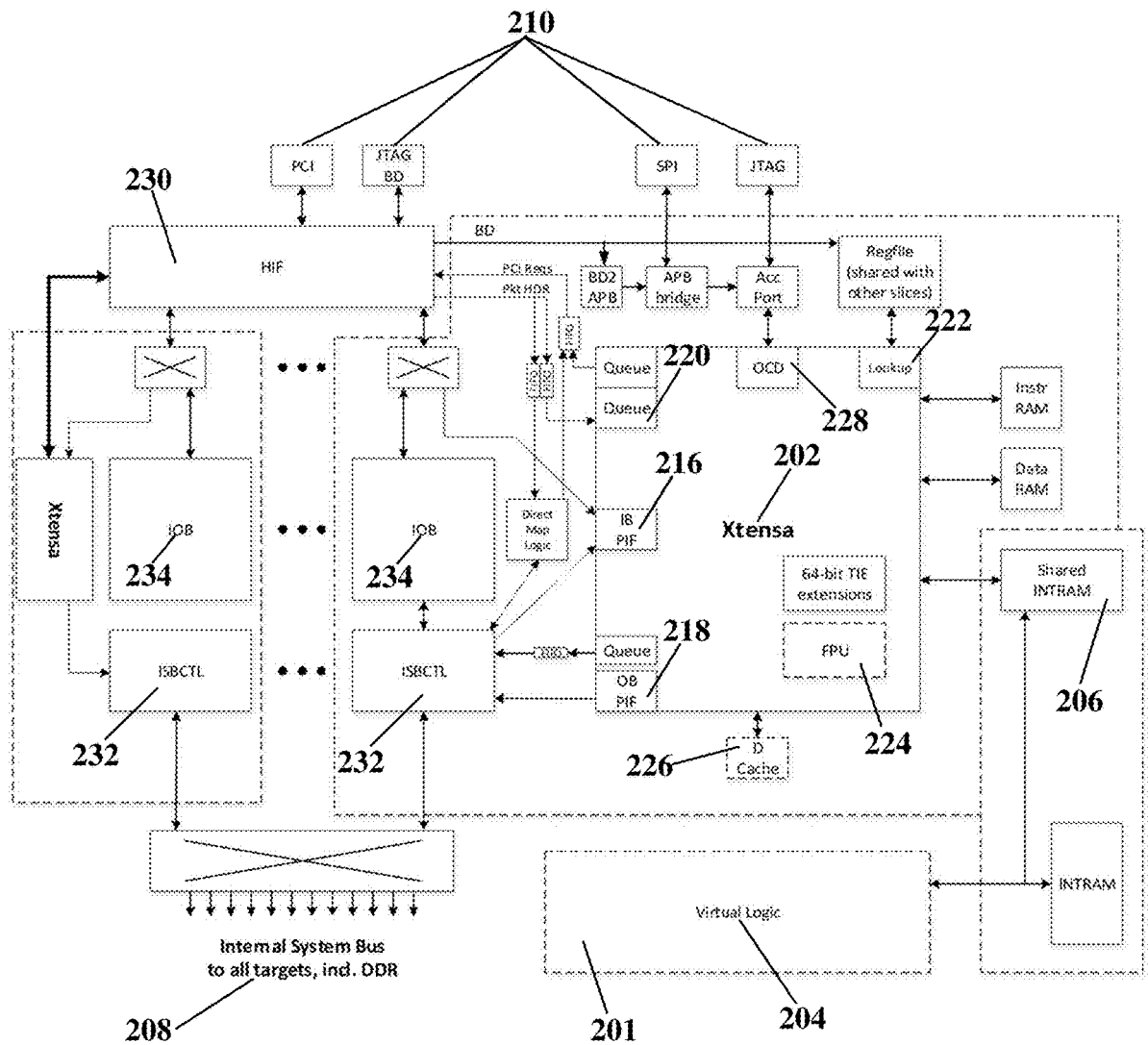
FIG. 2 shows a block diagram illustrating a shared memory enabling simulators running in a host workstation and emulators that are communicating with the simulators to exchange data, according to an embodiment.

FIG. 2 shows a block diagram 200 in an emulation chip (e.g., emulation chip 108 shown in FIG. 1B). The emulation chip may include programmable devices such as emulation cores 201 and simulation cores 202 for verification of a virtual logic 204. The emulation cores 201 and the simulation cores 202 may respectively execute emulation and simulation operations to test and verify the operation of the virtual logic 204. Upon execution of the emulation and the simulation operations, the emulation cores 201 and the simulation cores 202 may respectively generate the emulation data and the simulation data. The emulation cores 201 and the simulation cores 202 may have a direct read and write access into the shared memory device 206, and therefore write the emulation data and the simulation data directly into the shared memory device 206.

The emulation chip may further include a system bus 208, a plurality of interfaces 210, an instruction RAM 212, a data RAM 214, an inbound processor interface (PIF) 216, an outbound PIF 218, a plurality of queues 220, a lookup interface 222, a floating-point unit (FPU) 224, a data cache 226, an on-chip debug (OCD) interface 228, a host interface block (HIF) 230, ISB controller 232, and I/O Buffer (IOB) 234.

An emulation processor of the emulation core 201 while executing the one or more emulation operations on the virtual logic 204 may generate an emulation data record. The emulation processor may have write access to the shared memory device 206, which allows the emulation processor to interact directly with shared memory device 206 through a shared memory interface. The emulation processor may write the emulation data record into the shared memory device 206. The emulation processor may also be configured to transfer the data record from the shared memory device 206 into another separate database. The emulation processor may also be configured to read any data record (such as a simulation data record) from the shared memory device 206. Upon reading and evaluating the simulation data record from the shared memory device 206, the emulation processor may update one or more emulation operations. The emulation processor may then execute updated emulation operations.

A simulation core 202 may be configured to execute one or more simulation operations associated with the virtual logic 204. The simulator may execute simulation operations, and generate a simulation data record. The simulation core 202 may have direct write access to the shared memory device 206. The simulation core 202 may write the simulation data record into the shared memory device 206. The simulation core 202 may also be configured to transfer the data record from the shared memory device 206 into another separate database. The simulation core 202 may also be configured to read any data record (such as the emulation data record) from the shared memory device 206. Upon reading and evaluating the emulation data record from the shared memory device 206, the simulation core 202 may update one or more simulation operations.

A system bus 208 is a pathway composed of logic circuits to carry data (such as the emulation data records and the simulation data records) between emulation processors, simulation processors, the shared memory device 206, and a DDR memory. The system bus 208 may provide a communication path for the data and control signals moving between the major components of the emulation chip. For example, the internal system bus 208 may provide an electrical coupling between the simulation core 202 and other resources of the emulation ASIC. such as internal and external memories.

A plurality of interfaces 210 are coupled with physical layers of the emulation chip such that communication signals may be exchanged by the components of the emulation chip. The plurality of interfaces 210 may include various types of communication medium, including a cable, bus, and/or network. The buses include peripheral component interconnection (PCI) and joint test action group (JTAG) interface.

An inbound PIF 216 may provide an interface from the HIF 230 to access the simulation cores 202 and/or the emulation cores 201. The inbound PIF 216 may further be used to load the instruction RAM 212 and the data RAM 214. The inbound PIF 216 may also receive data from the ISB controller 232 to deposit the data directly from an internal target into the data RAM 214. An outbound PIF 218 is an interface that may access any on-chip resource or I/O Buffer (IOB) 234.

A plurality of queues 220 may include a first queue to receive inbound PCI packet headers. The plurality of queues 220 may further include a second queue to transmit outbound commands to the HIF 230. The plurality of queues 220 may further include a third queue to send commands to the ISB controller 232, which serve as a dynamic memory access (DMA) unit between IOB 234 and internal ISB targets.

A lookup interface 222 to an extended register space, which allows access to status of various components of the emulation chip such as FIFO, may be used for handshaking between the simulation cores 202 and the emulation cores 201. A FPU 224 may be used for acceleration of digital/mixed signal assistance. A data cache 226 may be used for efficient access to the DDR memory, if the simulation cores 202 and/or the emulation cores 201 needs to access a large size memory. The OCD interface 228 allows a debugger to interact with the simulation cores 202 and/or the emulation cores 201. For example, the OCD interface 228 may allow the debug operations of stepping and observing registers.

Figure 3:
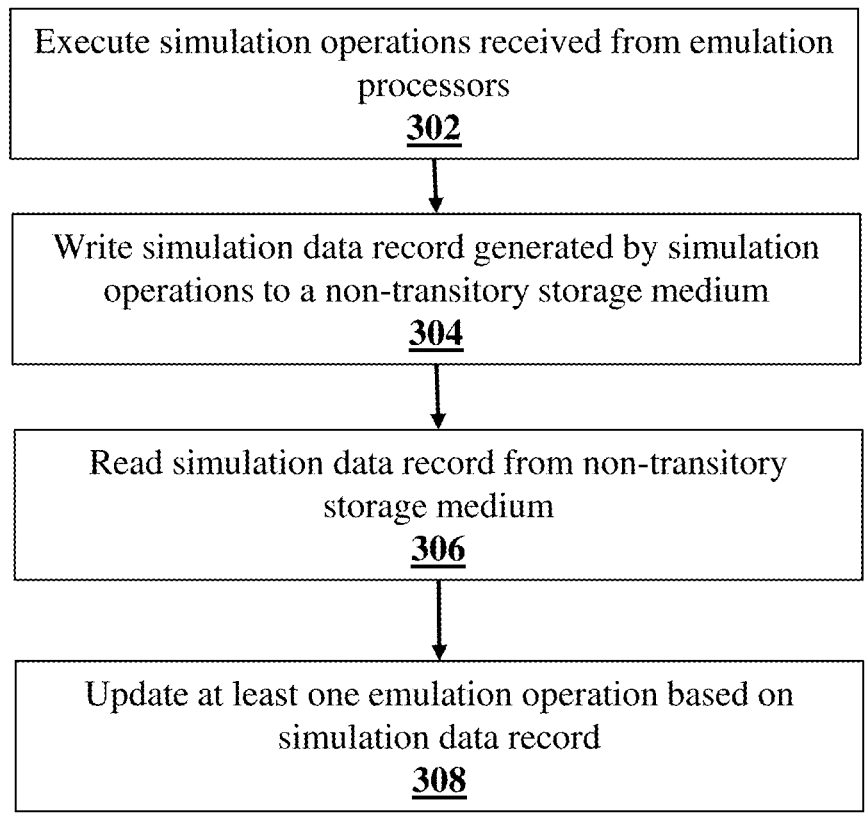
FIG. 3 shows a flow diagram of a method of using a shared memory enabling simulators running in a host workstation and emulators that are communicating with the simulators to exchange data, according to an embodiment.

FIG. 3 shows a flow diagram of a method 300 of using a shared memory enabling simulation operations within an emulation chip. The method 300 includes execution steps 302, 304, 306, and 308. However, other embodiments may include additional or alternative execution steps or may omit one or more steps altogether. The other embodiments may perform certain execution steps in a different order; steps may also be performed simultaneously or near-simultaneously with one another. In addition, the method 300 is described as being executed by a processor in this embodiment. However, in some embodiments, steps may be executed by any number of processors operating in a distributed computing environment. In some cases, a processor executing one or more steps may be programmed to execute various other, unrelated features, where such processor does not need to be operating strictly as the emulation processor and/or the simulation processor described herein.

At a first step 302, a set of simulation processors may execute simulation operations received from a set of emulation processors emulating a portion of design under test. For example, the set of emulation processors may reach an emulation step where one or more operations of the design under test cannot be performed in emulation but may have to be performed in simulation. As another example, the set of emulation processors may be responding to one or more test bench operations of the set of the simulation processors. In some embodiments, the set of simulation processors may be running a software application to be executed by the design under test after fabrication. In these embodiments, the simulation operations may be results of one or more calculations performed by the device under test being transmitted back to the software application.

At a next step 304, the set of simulation processors may write a simulation data record generated by the simulation operations to a non-transitory storage medium. The set of simulation processors may have a direct access to write into the non-transitory storage medium. The non-transitory storage medium is shared by the set of simulation processors and the set of emulation processors, that is, both the set of simulation processors and the set of emulation processors may have direct access to write data into the non-transitory storage medium. The set of simulation processors and the set of emulation processors may also have direct access to read the data from the non-transitory storage medium. The set of simulation processors and the set of emulation processors may also have direct access to transfer the data from the non-transitory storage medium into another database. The set of simulation processors and the set of emulation processors may read, write, or transfer the data from the non-transitory storage medium at any given point during the emulation and simulation process.

The non-transitory storage medium may be partitioned into a first storage medium and a second storage medium. The first storage medium is configured to store the simulation data record written by the simulation processor and the second storage medium is configured to store the emulation data record written by the emulation processor. The simulation processors may have write access into the first storage medium, and read access to both the first storage medium and the second storage medium. The emulation processors may have write access into the second storage medium, and read access to both the first storage medium and the second storage medium.

At a next step 306, a set of emulation processors having direct access to read and write data into the non-transitory storage medium may read the simulation data record from the non-transitory storage medium. In some embodiments, a notification may be received by the set of emulation processors whenever the set of simulation processors write the simulation data record into the non-transitory storage medium. Upon receiving the notification, the set of emulation processors may then read the simulation data record from the non-transitory storage medium. When the set of emulation processors may be reading the simulation data record from the non-transitory storage medium, the non-transitory storage medium is configured to block writing of any new simulation data record by the set of simulation processors. Upon the set of emulation processors completing the reading the simulation data record from the non-transitory storage medium, the non-transitory storage medium may transmit a notification to the set of simulation processors regarding availability to write any new simulation data record. Upon receiving the notification, the set of simulations processors may then write any new simulation data record into the non-transitory storage medium.

At a next step 308, a set of emulation processors may process and analyze the content in the simulation data record read from the non-transitory storage medium. In response to the processing and the analysis of the content of the simulation data record, the set of emulation processors may then update one or more emulation operations. Upon updating the one or more emulation operations of the design under test, the set of emulation processors may then execute updated emulation operations. In response to the execution of the updated emulation operations, the set of emulation processors may then generate new emulation data record.

The set of emulation processors may write the new emulation data record into the non-transitory storage medium. When the new emulation data is written into the non-transitory storage medium, a notification may be received by the set of simulation processors. Upon receiving the notification, the set of simulation processors may then read the new emulation data record from the non-transitory storage medium. The set of simulation processors may process and analyze the content in the new emulation data record read from the non-transitory storage medium. In response to the processing and the analysis of the content of the new emulation data record, the set of simulation processors may then update one or more simulation operations. Upon updating the one or more simulation operations, the set of simulation processors may then execute updated simulation operations. In response to the execution of the updated simulation operations of the design under test, the set of simulation processors may then generate new simulation data record. The set of simulation processors may write the new simulation data record into the non-transitory storage medium.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, flash storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. An emulation system comprising:
    an emulation chip comprising a non-transitory storage medium, an emulation processor including a programmable device configured to emulate a portion of a design under test, and a simulation processor, the non-transitory storage medium is coupled directly to the emulation processor and to simulation processor and is partitioned into a first portion configured to store emulation data for the emulation processor and a second portion configured to store simulation data for the simulation processor;
    the simulation processor configured to:
        execute one or more simulation operations using one or more signals received from the emulation processor emulating the portion of the design under test; and
        write a simulation data record generated by executing the one or more simulation operations to the first portion of the non-transitory storage medium of the emulation chip; and
    the emulation processor further configured to:
        read the simulation data record from at least one of the first portion or the second portion of the non-transitory storage medium;
        update at least one emulation operation of the design under test based on the simulation data record; and
        based on the updated at least one emulation operation, write an emulation data record to the second portion of the non-transitory storage medium of the emulation chip.

2. The emulation system according to claim 1, wherein the emulation processor is further configured to write an emulation data record generated by executing the at least one emulation operation to the non-transitory storage medium.

3. The emulation system according to claim 1, wherein the design under test includes an instrumentation logic and wherein the simulation processor is further configured to:
    receive logic states of one or more signals in the design under test from the instrumentation logic; and
    perform a design property check based upon the logic states of the one or more signals.

4. The emulation system according to claim 3, wherein the design property check is an assertion check.

5. The emulation system according to claim 1, wherein the non-transitory storage medium is embedded in the emulation chip.

6. The emulation system according to claim 1, wherein the design under test includes an instrumentation logic and wherein the simulation processor is further configured to:
receive logic states of one or more signals in the design under test from the instrumentation logic; and
perform a coverage analysis of the design under test based upon the logic states of the one or more signals and one or more design verification metrics.

7. The emulation system according to claim 1, wherein the simulation processor is further configured to transfer data between the emulation processor and a host system.

8. The emulation system according to claim 1, wherein simulation processor is further configured to support one or more debugging operations.

9. The emulation system according to claim 1, wherein the design under test includes an instrumentation logic and wherein the simulation processor is further configured to:
receive logic states of one or more signals in the design under test from the instrumentation logic;
determine toggling properties of the one or more signals based on the logic states of the more signals; and
estimate a power consumption of the design under test based upon the toggling properties of the one or more signals.

10. An emulation method comprising:
emulating, by an emulation processor included in an emulation chip, a portion of a design under test, wherein the emulation processor includes a programmable device;
executing, by a simulation processor included in the emulation chip, one or more simulation operations using one or more signals received from the emulation processor emulating the portion of a design under test;
writing, by the simulation processor to a non-transitory storage medium in the emulation chip, a simulation data record generated by executing the one or more simulation operations, the non-transitory storage medium is coupled directly to the emulation processor and to simulation processor and is partitioned into a first portion configured to store emulation data for the emulation processor and a second portion configured to store simulation data for the simulation processor;
reading, by the emulation processor from at least one of the first portion or the second portion of the non-transitory storage medium, the simulation data record;
updating, by the emulation processor, at least one emulation operation of the design under test based on the simulation data record; and
based on the updated at least one emulation operation, writing an emulation data record to the second portion of the non-transitory storage medium of the emulation chip.

11. The emulation method according to claim 10, further comprising:
writing, by the emulation processor to the non-transitory storage medium, an emulation data record generated by executing the at least one emulation operation.

12. The emulation method according to claim 10, further comprising:
receiving, by the simulation processor, logic states of one or more signals in the design under test from an instrumentation logic in the design under test; and
performing, by the simulation processor, a design property check based upon the logic states of the one or more signals.

13. The emulation method according to claim 12, wherein the design property check is an assertion check.

14. The emulation method according to claim 10, wherein the non-transitory storage medium is embedded in the emulation chip.

15. The emulation method according to claim 10, further comprising:
receiving, by the simulation processor, logic states of one or more signals in the design under test from an instrumentation logic in the design under test; and
performing, by the simulation processor, a coverage analysis of the design under test based upon the logic states of the one or more signals and one or more design verification metrics.

16. The emulation method according to claim 10, further comprising transferring, by the simulation processor, data between the emulation processor and a host system.

17. The emulation method according to claim 10, wherein simulation processor is configured to support one or more debugging operations.

18. The emulation method according to claim 10, further comprising:
receiving, by the simulation processor, logic states of one or more signals in the design under test from an instrumentation logic in the design under test;
determining, by the simulation processor, toggling properties of the one or more signals based on the logic states of the more signals; and
estimating, by the simulation processor, a power consumption of the design under test based upon the toggling properties of the one or more signals.

* * * * *